Aug. 26, 1952     C. E. FRASER     2,608,226
MACHINE FOR ABRADING CITRUS FRUITS
Filed April 15, 1948     5 Sheets-Sheet 1

INVENTOR.
Charles E. Fraser
BY
Norman N. Holland
ATTORNEY

Aug. 26, 1952 C. E. FRASER 2,608,226
MACHINE FOR ABRADING CITRUS FRUITS
Filed April 15, 1948 5 Sheets-Sheet 2

INVENTOR.
Charles E. Fraser
BY
Norman H. Holland
ATTORNEY

Aug. 26, 1952 C. E. FRASER 2,608,226
MACHINE FOR ABRADING CITRUS FRUITS
Filed April 15, 1948 5 Sheets-Sheet 3

INVENTOR.
Charles E. Fraser
BY
Norman N. Holland
ATTORNEY

Aug. 26, 1952     C. E. FRASER     2,608,226
MACHINE FOR ABRADING CITRUS FRUITS
Filed April 15, 1948     5 Sheets-Sheet 4

INVENTOR.
*Charles E. Fraser*
BY
*Norman A. Hollan*
ATTORNEY

Aug. 26, 1952 — C. E. FRASER — 2,608,226
MACHINE FOR ABRADING CITRUS FRUITS
Filed April 15, 1948 — 5 Sheets-Sheet 5

INVENTOR.
Charles E. Fraser
BY
Norman T. Holland
ATTORNEY

Patented Aug. 26, 1952

2,608,226

UNITED STATES PATENT OFFICE 2,608,226

MACHINE FOR ABRADING CITRUS FRUITS

Charles E. Fraser, Kew Gardens, N. Y., assignor to Fraser-Brace Engineering Co., Inc., New York, N. Y., a corporation of New Hampshire Application April 15, 1948, Serial No. 21,107

6 Claims. (Cl. 146—3)

1

The present invention relates generally to a machine for removing the exterior surfaces or coverings from citrus fruits by abrading or grating and more particularly to improvements upon the apparatus disclosed in my previous application Serial No. 757,720, now Patent No. 2,529,286, filed in the United States Patent Office on June 28, 1947.

In my said previous application it is pointed out that, in order to obtain the juices from such fruits as oranges, grapefruit, tangerines, lemons, et cetera the practice has been to subject the fruit, in the condition in which received from the trees, to some sort of squeezing, pressing or reaming operation. One difficulty encountered in juice extraction has been that, in addition to expressing the juice from the fruit there has also been simultaneously removed a portion of the oils or waxes held by the outer fruit coverings; these oils or waxes detrimentally affect the taste of the juice and also objectionably interfere with its flavor-keeping properties. While the problem of expressing fruit juice is not as critical with grapefruit as in the case of oranges it nevertheless presents similar difficulties.

Attempts have been made to ease the difficulty by setting or adjusting expressing mechanisms so that they do not completely squeeze, press or ream the fruit, the thought being that the fruit should be subjected to sufficient pressure to remove the majority of the contained juice without crushing the external coverings to release the oils or waxes. This procedure results in obtaining lesser quantities of juice and the juice produced is therefore more expensive. The expedient is further objectionable in that it still does not result in the production of juices which are entirely free of contamination by the oils and waxes of the fruit covering; it is practically impossible to avoid crushing or breaking the coverings in such manner as to release a portion of the oils and waxes. Other attempts have been made to overcome the difficulty by "de-oiling" the juice shortly after it is extracted. This is essentially a partial distillation operation and has not proven completely successful in that the juice is not greatly improved in taste and for the further reason that there is a tendency for the distillation operation to remove only lighter elements of the oils and waxes.

It is an aim of the present invention to overcome disadvantages and difficulties such as the above by providing a new and improved machine for removing a majority of the oils or waxes from the fruit covering prior to subjecting the fruit to an expressing operation. The invention further contemplates the provision of a new and improved fruit abrading or grating machine embodying improved fruit feeding or moving means.

An object of the invention is to provide a new and improved fruit abrading machine.

Another object is to provide a fruit abrading machine embodying new and improved fruit moving means.

Another object of the invention is to provide a fruit abrading machine adapted to impart improved and enhanced motion to the fruit during abrading thereof.

A further object of the invention is to provide a fruit abrading machine embodying new and improved fruit agitating means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 3b is a sectional view taken along the line 3b—3b of Fig. 3a;

The term "abrading" is used herein in a general sense and it is intended to include grating, scraping or similar actions by which exterior or outer covering portions of the fruit are removed by rubbing contact between the fruit and a suitable relatively rough surface.

Since one of the greatest fields of usefulness of the machine is for the treatment of oranges it will be more particularly described in connection with the treatment of that fruit. It is, however, equally adapted to the treatment of grapefruit or fruits of more elongate, ovate, or non-spherical shapes such as lemons, tangerines, and the like.

Described generally, the machine comprises (Figs. 1, 2, 3 and 6) hopper portions 1, 2, 3 for initially receiving and directing oranges to longitudinal guide channels 47—48, 49—50, 51—52 and fruit feeding screws 6—7, 8—9, 10—11 for removing oranges from the hopper portions of the machine and arranging them in continuous rows for delivery to an abrading or grating means. The abrading means includes a plurality of sets of abrading rollers in the form of substantially U-shaped channels 16, 17, 18 (Fig. 5); the abrading rollers are enclosed within an abrading chamber or tunnel 13, through which the oranges move in continuous rows. Electric drive motors 34 and 35 supported on top of the abrading chamber 13 actuate the various parts through suitable pulleys, sprockets, chains and belts. Fruit covering particles removed from the fruit while the fruit is within the abrading chamber 13 are washed downwardly toward and along the bottom 31 of the abrading chamber 13 by liquid sprayed from nozzles 26, 27, 28 directed toward the abrading rollers. Liquid from these nozzles picks up the removed particles and carries the resulting slurry along the bottom 31 of the machine into a collecting trough 32, from which the slurry may be removed in any suitable manner and either discharged or recirculated any desired number of times. Abraded oranges emerging from the discharge end of the abrading chamber 13 may be guided by appropriate means (not shown) to machines for expressing the juice therefrom. The hopper portions, fruit aligning and moving means, and the fruit abrading means may be supported by suitable legs or framework 5. The various parts of the machine and its operation will now be described in detail.

Figure 1:
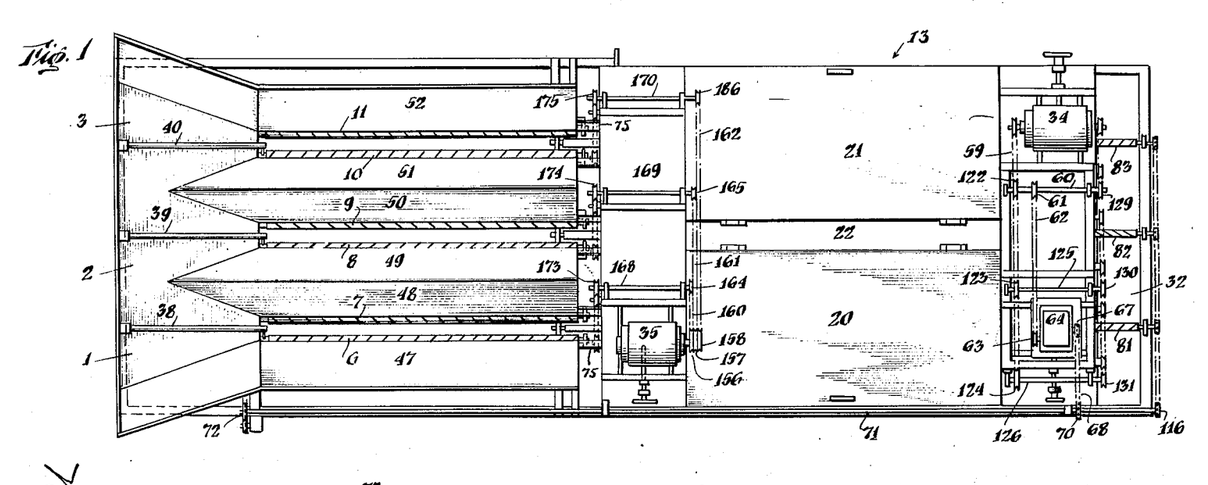
Fig. 1 is a top plan view of the present machine.
Figure 3:
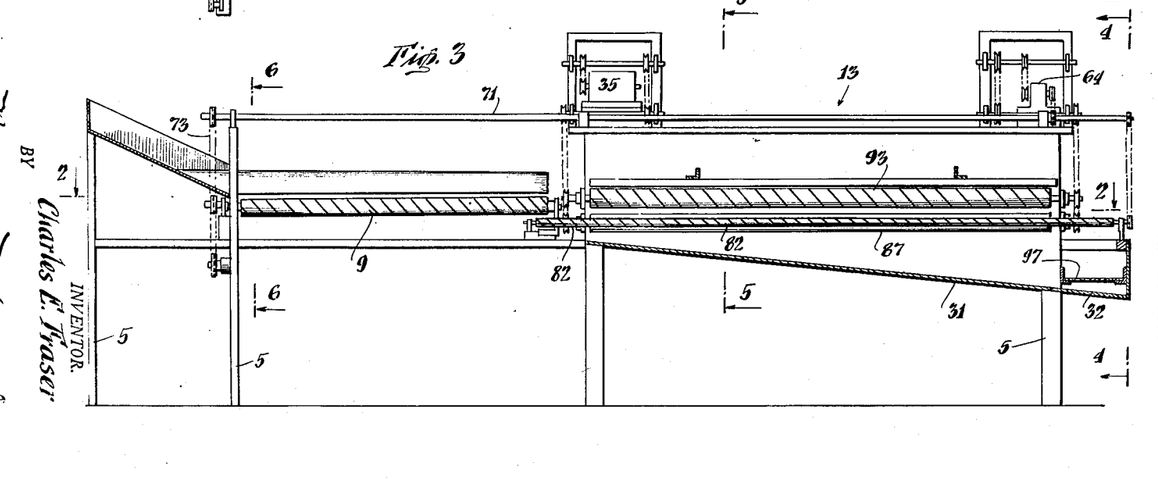
Fig. 3 is a vertical sectional view through the present machine.
Figure 8:
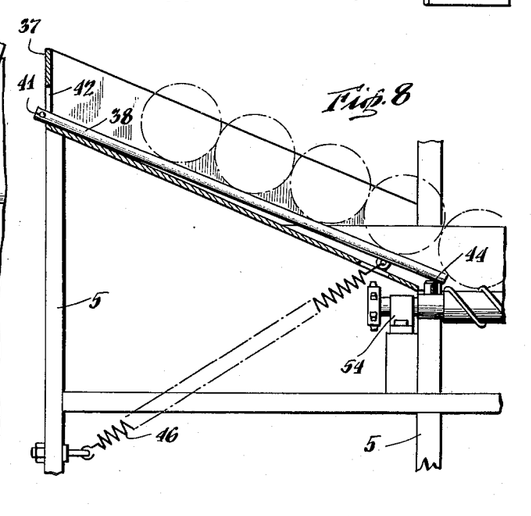
Fig. 8 is a vertical sectional view showing the fruit agitating means.

The hopper portions 1, 2, 3 shown at the left of Figs. 1 and 3 act as reservoirs for holding a mass or pile of fruit. Each hopper portion has an outer fruit retaining end wall 37, and outer side walls of the hopper are inwardly inclined so that fruit tends to move downwardly under influence of gravity toward the bottom and outlet of the hopper portions. Downward movement of fruit is facilitated by movable agitator bars, 38, 39, 40 shown (Figs. 1, 8) extending along the lower part of each hopper portion. Each agitator bar is held in position at one end by a cross pin 41 which normally extends transversely across a receiving aperture 42 in the end wall 37; the cross bars 41 and slots 42 provide pivotal connections about which the ends of the agitator bars may move and also facilitate removal of an agitator bar. The lower end of each agitator bar is positioned adjacent the ends of the fruit aligning and fruit moving screws 6—7, 8—9, 10—11, and is adapted to be periodically lifted by a cam or projection 44 carried by one of each of the pairs of rotatable fruit moving screws. As a fruit moving screw is rotated, the projection 44 intermittently contacts the lower end of an agitator bar to lift and lower it and to thus provide a gentle disturbing or agitating effect upon fruit contained within the hopper. If desired, several projections similar to the projection 44 may be utilized to lift an agitator several times during each revolution of the particular fruit feeding screw. It has been found, however, that a single projection 44 such as shown in Fig. 8 gives excellent results by causing a gentle disturbance of the fruit which causes it to move downwardly toward the co-operating pairs of fruit moving screws 6—7, 8—9, 10—11. Agitation of the fruit in this manner minimizes the possibility of "bridging" and effects continual flow or movement of fruit toward the lower exit portions of the hopper and from the hopper toward the feed screws of the feed portion 4. Each agitator bar is preferably pulled downwardly by a spring or other resilient means 46 connected with the lower end thereof, the opposite end of each spring being suitably fastened to the frame 5 of the machine (Fig. 8).

Figure 6:
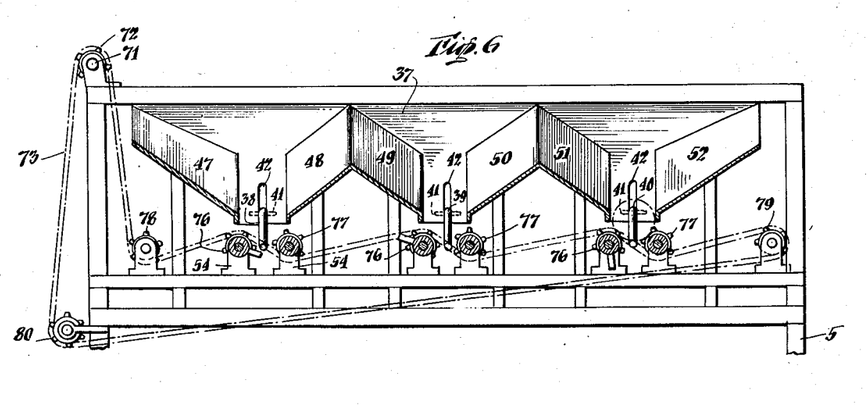
Fig. 6 is a vertical sectional view taken along the line 6—6 of Fig. 3.

Each of the hopper portions 1, 2, 3 shown at the left of the machine merges or connects at its open discharge side with elongate fruit guide means or channel-forming members 47—48, 49—50, 51—52. Oppositely disposed walls of the channel-forming members are downwardly inclined toward each other and form a substantially open bottom V (Figs. 1, 6). The lower free edge of each channel-forming member is preferably bent downwardly at an angle toward the elongate rotatable fruit moving rollers or screws to a position substantially in alignment with the longitudinal axes of the fruit moving screws; thus any sharp or rough free edges are in such position as to be normally free of contact with fruit carried along by fruit moving screws between the spaced lower ends of the guide channels. This feature minimizes objectionable cutting or scarring of the fruit.

Figure 3A:
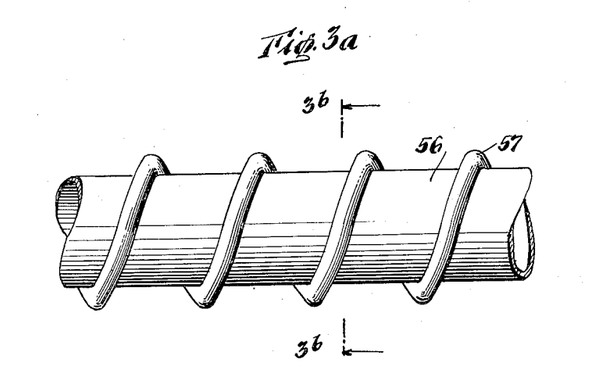
Fig. 3a is a fragmentary elevational view illustrating details of a preferred form of fruit moving means.
Figure 3B:
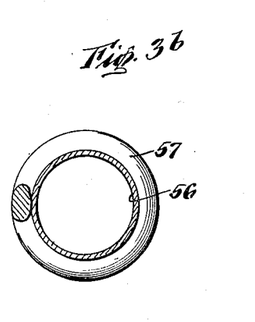

Each of the fruit moving screws or rollers 6—7, 8—9, 10—11, is rotatably supported adjacent its free ends in suitable bearings 54, 55 so that it may be revolved about its longitudinal axis. The outer surface of each of these rollers is spirally arranged so that upon appropriate rotation of the roller the spirals cause fruit resting on the rollers to move longitudinally therealong. The details of construction of a preferred form of fruit moving screw or roller are shown more particularly in Figs. 3a and 3b wherein there is illustrated a tubular or pipe-like member 56 having wound spirally thereon a rod member 57 of substantially circular cross section. While any suitable spacings or dimensions may be utilized it has been found effective to utilize a tubular center member having a diameter of approximately three inches and wound rod of approximately five-sixteenths of an inch in diameter, the rod 57 being wrapped around the tube 56 at intervals of approximately two and one-half inches. With fruit moving screws of such dimensions it has been found satisfactory to space the feed screws apart at a distance of approximately four to five inches. These particular dimensions have been found in actual practice to perform in satisfactory manner when handling normal sizes and shapes of oranges and grapefruit. Any other suitable dimensions and spacings may be utilized.

Oranges fed between the fruit guides 47—48, 49—50, 51—52 and onto the upper surface of the adjacent fruit moving screws 6—7, 8—9, 10—11, are supported partly by each screw of the pair of screws. Upon rotation of the screws the spiral surfaces propel the supported oranges along the screws toward the abrading chamber 13.

While the fruit moving screws may be rotated in any suitable manner to move fruit toward the grating or abrading chamber 13 it is preferably to so rotate them that their inner adjacent surfaces move upwardly and away from each other (Fig. 6). This minimizes or prevents fruit being squeezed or pressed downwardly between the pair of co-operating screws; the tendency of the co-operating screws is thus to elevate the fruit being acted upon and move it forwardly toward the abrading chamber. Utilization of the circular cross section rod 57 which is wound in spiral fashion around the tubular member 56 provides a feeding helix of smoothly rounded contours which moves fruit along without digging into the fruit coverings; all sharp edges are thus avoided and as a result fruit is discharged from the exit ends of the co-operating fruit feeding screws in the same condition in which it is received at the entrance ends thereof.

It has been found that enhanced results in feeding fruit from the hoppers to the abrading chamber are achieved by positioning the discharge ends of the co-operating pairs of fruit feed screws at a slightly higher elevation than the entrance ends so that fruit tends to move upwardly along a slight incline toward the abrading chamber 13. This construction contributes toward the picking up of single oranges from a feed hopper and their movement in a substantially continuous linear row along the fruit feed screws.

In operation oranges move out of the hoppers and along through the guide channels in single file without piling or climbing on top of each other. This is a very desirable feature as it results in automatically feeding fruit into the grating or abrading chamber 13 at only those times when there is room for the fruit; that is, fruit moves in substantially continuously flowing line along the rotating fruit moving screws and into and through the abrading chamber 13. As one orange emerges from the discharge end of the abrading chamber 13 a fresh orange automatically feeds into the entrance end thereof. In the event of some stoppage or sudden shut down in abrading or grating operations the fruit feeding screws merely allow the fruit to roll over and over without damaging it. The rounded surfaces of the spirally wound rods 57 facilitate this movement as the fruit may roll over the rods 57 without objectionable cutting, scarring, abrasion or other damage thereto. When any defect in the grater chamber has been remedied the fruit automatically commences to again feed into the abrading chamber.

While the fruit feeding screws 6—7, 8—9, 10—11 may be rotated by any suitable means a preferred driving means for them comprises a drive motor 34 shown mounted at the upper right hand end of the abrading chamber 13. This electric motor is shown (Figs. 1, 6) rotating the fruit feed screws through the intermediation of drive belt 59, shaft 60, pulley 61, drive belt 62, pulley 63, speed reducer 64, sprocket 67, drive chain 68, sprocket 70, shaft 71, sprocket 72 and drive chain 73. The drive chain is shown positioned adjacent the outer ends of the fruit feed screws and connected with them by passing over and under meshing sprockets 76 and 77 carried adjacent the outer ends of each of the fruit feed screws. Additional idler sprockets 78, 79 and 80 (Fig. 6) serve to properly direct the drive chain 73 over and under the drive sprockets of the fruit feed screws. The over and under arrangement of the drive chain 73 is effective to rotate shaft 71 in such direction as to cause the previously described upward and outward rotation of the pairs of fruit feed screws. The arrangement and construction described and shown has been found to give good results in actual operation, any other suitable driving means may be utilized, for example, gear trains or individual electric drive motors.

Figure 2:
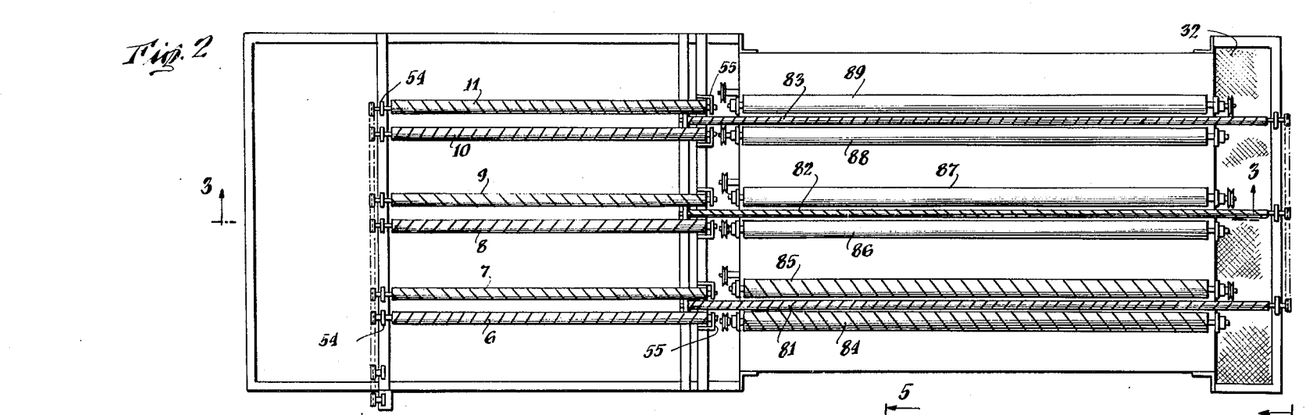
Fig. 2 is a horizontal sectional view taken along the line 2—2 of Fig. 3.

From the exit or discharge ends of the fruit moving screws 6—7, 8—9, 10—11 the oranges, grapefruit or other fruit are delivered to rotatable feed screws 81, 82, 83 of the abrading chamber 13. Sheet metal guide walls 75 are preferably provided (Fig. 1) intermediate the discharge ends of the fruit feeding rollers and the entrances to the abrading chamber 13 to guide the fruit into the abrading chamber 13. These latter screws are shown (Figs. 2, 3, 4) positioned below and extending partially beneath the discharge ends of the pairs of fruit moving screws 6—7, 8—9, 10—11 and move oranges through the abrading chamber along the abrading rollers while simultaneously providing an additional spin axis effective upon the fruit. The abrading chamber feed screws are positioned intermediate lower elongate abrading rollers 84—85, 86—87, 88—89, of sets of abrading rollers shown positioned at intervals across the width of the abrading chamber 13. The abrading rollers of each set of rollers form, in cross section, what may be referred to, for purposes of convenience in description, as abrading channels. The abrading chamber fruit feeding screws may be of the same general construction as previously described in connection with the fruit feed screws but are preferably of smaller size, comprising a shaft or tube approximately one and one-quarter inches in diameter with an approximately one-quarter inch diameter rod wound spirally around the shaft or tube (Figs. 2 and 5).

Each of the elongate abrading or grating rollers of the transversely positioned sets of abrading rollers 16, 17 and 18 (Fig. 5) is mounted in bearings adjacent its ends so that it may be readily rotated about a longitudinal axis and each abrading roller is provided adjacent one of its ends with a pulley for connection with a drive belt and other operating mechanisms to be hereinafter fully described. The drive pulleys of abrading rollers 85—91, 87—93, 89—95 are adjacent the discharge side of the abrading chamber 13. This construction facilitates rotating abrading rollers at opposite sides of the substantially U-shaped channels 16, 17, 18 in desired directions. The rollers which form opposite sides of the abrading channels 16, 17, 18 may be rotated in opposite directions with respect to each other or in the same direction to impart desired spin and movement to fruit being fed through the abrading chamber.

Each of the abrading rollers has its outer surface (Figs. 2, 3) covered with a suitable roughened surface adapted to rub particles or portions of the skin coverings from oranges passing along the rollers. The use of a Carborundum-type abrasive has proven highly satisfactory. Preferably the Carborundum abrasive material is applied in the form of relatively long lengths or strips wound in spiral manner about the exterior surfaces of the various abrading rollers.

While the direction in which the abrasive is wound around the abrading rollers may be varied it has been found advantageous to apply it in "reverse" direction to some of the abrading rollers so as to obtain increased variations or changes in the axis of spin of fruit passing through the U-shaped abrading channels 16, 17, 18. In Fig. 2 the Carborundum abrasive strips are shown applied to the lower rollers 84, 85, 86, 87, 88 and 89 in a direction opposite to the spirals of the respective intermediate feed screws 81, 82, 83. The abrasive may be applied to the upper rollers of each abrading channel 16, 17 and 18 in directions opposite to that of the lower rollers for imparting additional changes to the spin axes of fruit. In instances where each of the abrading rollers is rotated in counterclockwise direction, the oppositely wound strips of Carborundum abrasive tend to reverse the directions of spin of the fruit as it is moved along through the abrasive channels by the intermediately disposed fruit feed screws 81, 82, 83. The fruit bounces around and along within the channels and against the rollers during its movement through the abrasive channels and the spiral windings of some rollers tend to rotate fruit in one direction; oppositely wound abrasive coatings on other abrading rollers tend to reverse the directions of rotation of the fruit and, as a result, the fruit moves along in a bouncing manner through the abrading channels with its axis of rotation continually changing. Elongate cover plates 107, 108, 109 extend lengthwise over the abrading channels and maintain fruit with the channels.

The fruit feeding screws 81, 82, 83 may be rotated in either clockwise or counterclockwise direction depending upon which particular direction of rotation is felt to further enhance the bouncing movement and the changes in the spin axis of the fruit. The spiral winding for the particular feed screw is such as to move fruit forwardly toward the discharge end of the abrading chamber 13.

The abrading rollers may be moved toward and away from each other to accommodate different sizes of fruit. A normal spacing or setting of the abrading rollers for handling the usual size of oranges permits grating of fruits from approximately two inches in diameter up to five inches in diameter. If it is desired to treat fruit more than five inches in diameter the abrading rollers may be readily set further apart by suitably positioning the bearing or adjustment plates 96 and 99 (Fig. 4) which support the ends of the abrading rollers. When a particular adjustment has been made the bearing plates and abrading rollers may be securely held in position by tightening the bolts which hold the bearing plates against the ends of the abrading chamber 13. The longitudinally extending cover members 107, 108 and 109 (Fig. 5) for each of the abrading channels may be vertically shifted in position by adjusting the bolts 113 and 114 which support opposite ends of the transversely extending plate-supporting members 112.

Figure 7:
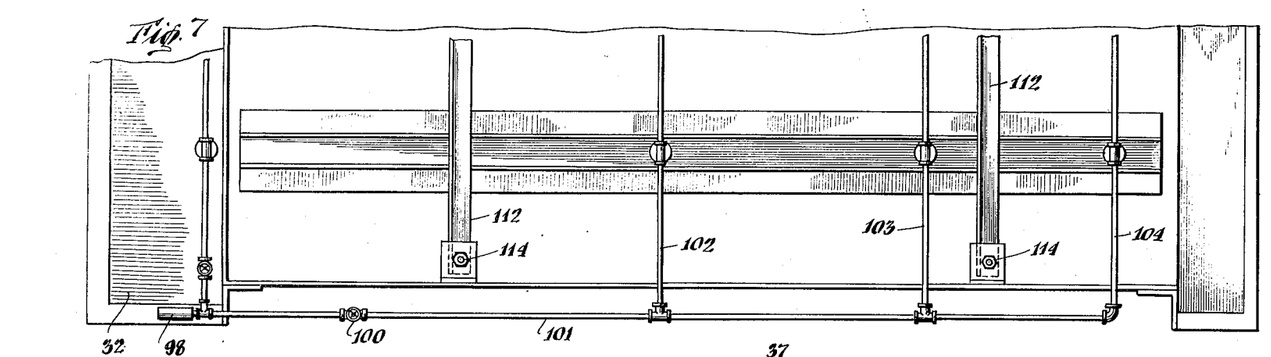
Fig. 7 is a fragmentary top plan view showing a piping and spray jet arrangement of the present machine.

Particles or portions of fruit rubbed or abraded from the outer surface of the continually bouncing fruit are washed downwardly toward the bottom 31 of the abrading chamber 13 by high pressure sprays or jets of water from downwardly directed nozzles 26, 27 and 28. The nozzles are positioned at intervals along the length of the abrading chamber (Fig. 7) and the jets of water therefrom pass through openings in the abrading channel covers 107, 108 and 109 and effectively wash abraded particles from the abrading rollers and the feed screws 81, 82, 83. Water may be supplied to the nozzles through any suitable piping system. As illustrated in Fig. 7 a recirculation system is utilized, water from the discharge tank being removed from the collecting trough 32 through a strainer 98, located beneath a grill or screen 97, and recirculated through valves 100 and conduits 101, 102, 103, 104. A recirculation system need not be utilized and fresh water may be continually fed into the piping system, the slurry being drawn off from the collecting trough 32 by any suitable collecting conduits.

The sheet metal side walls, end walls, bottom and top of the abrading chamber 13 completely enclose the abrading rollers, fruit feeding screws and spray nozzles to keep out dirt and confine the sprays and abraded fruit particles. Covers 20 and 21 hingedly connected with a channel member 22 facilitate inspection and maintenance or repair of parts.

Actuation or rotation of the intermediately positioned feed screws 81, 82, 83 may be achieved by the drive motor 34 (Figs. 1, 4) through the shaft 71 which serves to rotate the fruit moving rollers shown at the left end of the machine. The longitudinally extending shaft 71 rotates the intermediately positioned fruit feeding screws through sprocket 116, drive belt 117 and sprockets 118, 119 and 120 fixed to the discharge ends of the respective rollers (Figs. 1, 3, 4); as illustrated, outer feed screws 81 and 83 are rotated in counterclockwise direction and the middle feed screw is rotated in clockwise direction. The spiral arrangement of the feed screws is such as to provide forward movement of fruit through the abrading chamber 13 even though the directions of rotation of the particular feed screws may differ.

The abrading rollers 85—91, 87—93, 89—95 forming one side of each of the abrading channels 16, 17 and 18 may be rotated in counterclockwise direction by the drive motor 34 through belt 59, pulleys 122, 123, 124, shafts 60, 125, 126, pulleys 129, 130, 131, drive belts 133, 134, 135 and pulleys 138, 139, 140, 141, 142, 143 mounted adjacent the discharge ends of the abrading rollers.

Figure 4:
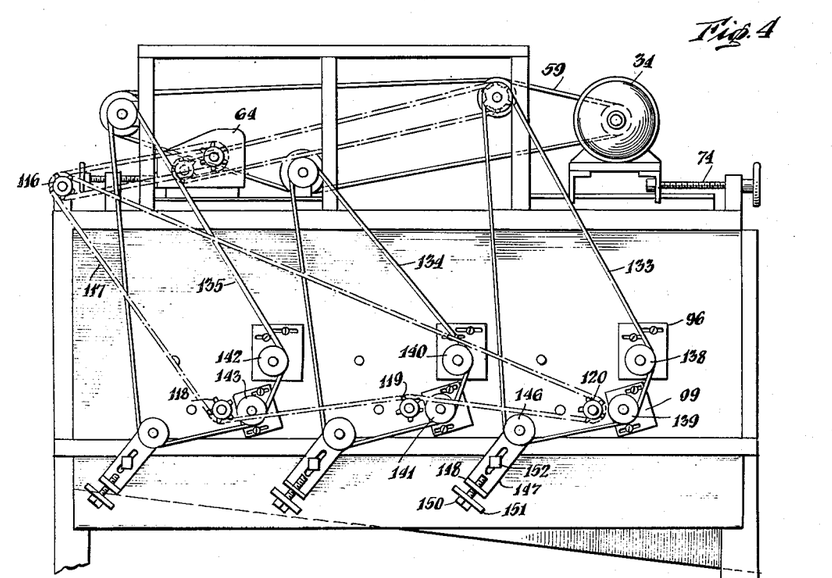
Fig. 4 is a view of the discharge end of the present machine taken along the line 4—4 of Fig. 3.
Figure 5:
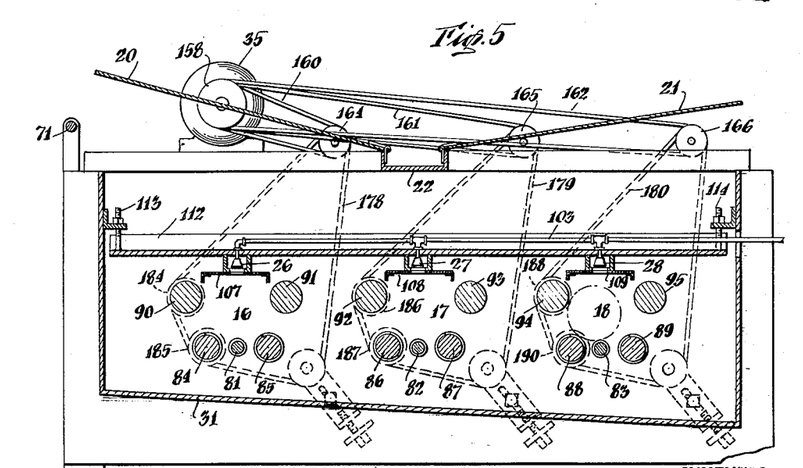
Fig. 5 is a vertical sectional view taken along the line 5—5 of Fig. 3.

Adjustment of the drive belts 133, 134, and 135 may be made by adjusting means shown adjacent the feed rollers (Fig. 4). Each of the adjusting means comprises a pulley 146 around which passes the particular belt, the pulley 146 being rotatably mounted adjacent the end of a bracket arm 147. One end of the bracket arm 147 has an offset portion 148 through which is threaded a bolt 150. The bolt 150 also extends through a bracket 151 with the head of the bolt resting against the outer surface of the bracket 151. Rotation of the bolt 150 effects movement of the bracket arm 147 to vary the tension of the particular drive belt 133, 134 or 135. An adjusted position may be maintained by tightening the locking bolt 152.

The abrading rollers 84—90, 86—92, 88—94 forming opposite sides of the abrading channels 16, 17 and 18 are shown (Figs. 1, 3, 5) rotated by a separate driving motor 35 through pulleys 156, 157, 158, drive belts 160, 161, 162, pulleys 164, 165, 166 mounted on respective shafts 168, 169 and 170, and pulleys 173, 174, 175 carried adjacent the opposite ends of the respective shafts 168, 169 and 170. Drive belts 178, 179 and 180 connect the respective pulleys 173, 174 and 175 with roller pulleys 184, 185, 186, 187, 189, 190.

Belt tightening or adjusting means similar to those described above are preferably utilized for varying the tensions of the belts 178, 179 and 180.

From the foregoing description it will be seen that the motor 34 operates the agitators 38, 39 and 40 of the hopper shown at the left of the machine, rotates the fruit moving rollers 6—7, 8—9, 10—11, rotates the abrading chamber feed screws 81, 82 and 83 and also turns the abrading rollers 85—91, 87—93, and 89—95 which form one side of the abrading channels 16, 17 and 18. The separate motor 35 rotates the abrading rollers 84—90, 86—92 and 88—94 of the abrading channels 16, 17 and 18. Driving motors 34 and 35 normally turning at about 1200 revolutions per minute have proven satisfactory but other suitable speeds may be used; the motors may be operated at different speeds with respect to each other to enhance the bouncing and abrading action which takes place in the abrading channel. The abrading rollers turned by the drive motor 35 may be rotated at different speeds than the abrading chamber feed screws 81, 82, and 83 to thus further enhance the changes in the spin axis of fruit passing through the abrading chamber 13. Adjusting hand wheels and shafts 74 are provided for varying the tensions of the drive belts connected with the motor pulleys.

Abraded or grated fruit emerging from the abrading channels of the abrading chamber 13 may be conducted by guide chutes or the like to receptacles or directly to machines for expressing the juices therefrom (not shown).

Figure 9:
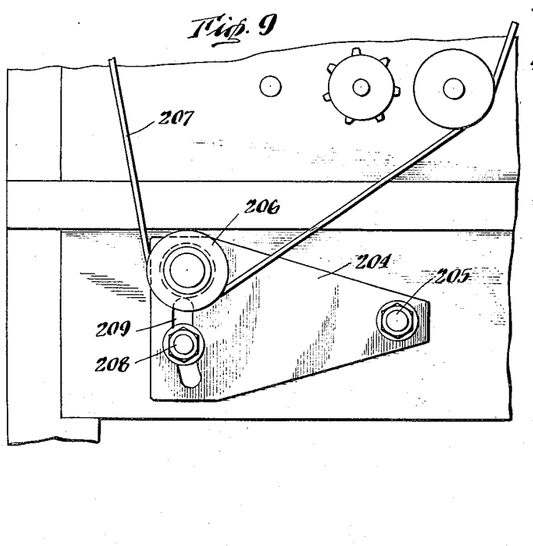
Fig. 9 is a fragmentary elevational view illustrating a modified form of drive belt adjusting means.

In Fig. 9 there is illustrated a modified form of belt adjusting means. As shown in this figure the belt adjusting means comprises a plate 204 pivotally mounted on a bolt 205 and carrying a rotatable pulley 206 adjacent its opposite end. The plate may be rotated about the pivot 205 to vary the pressure of the pulley 206 on the particular drive belt 207. When a desired adjustment has been made the plate 204 may be clamped in position by a locking bolt and washer 208 shown extending through an elongate adjustment slot 209.

Figure 10:
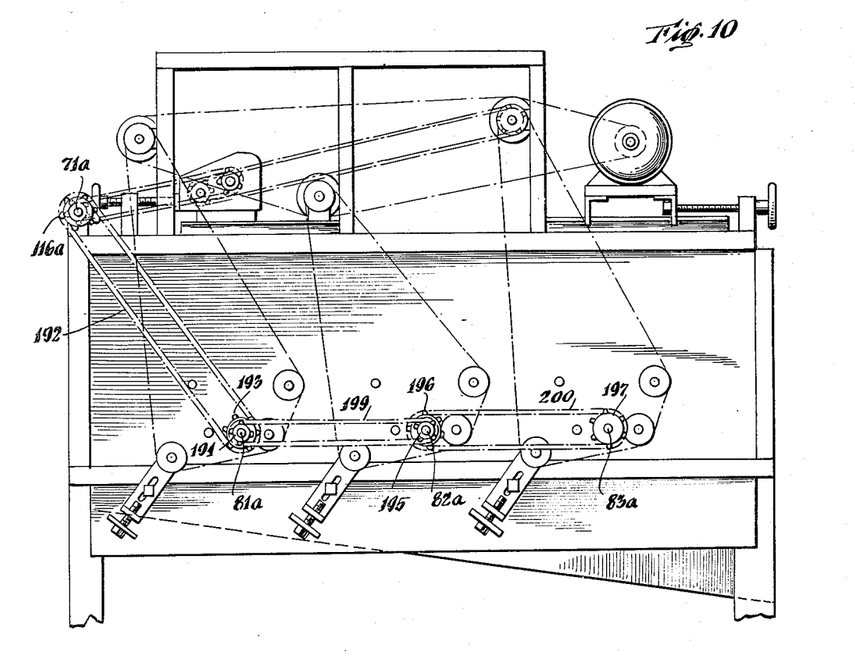
Fig. 10 is an elevational view illustrating a modified form of drive means.

In Fig. 10 there is shown a modified form of drive arrangement which may be used with the abrading chamber feed screws and the abrading rollers which form one side of an abrading channel. This form of drive differs from that previously described in that the sprocket 116a carried by the longitudinally extending shaft 71a connects by a drive chain 192 with a sprocket 193. The sprocket 193 rotates the feed screw 81a through a common shaft and also serves to rotate a sprocket 194 carried adjacent the outer end of the said common shaft. Rotation of the feed screw 81a and sprocket 194 in turn drives the feed screws 82a and 83a through the sprockets 195, 196 and 197 and the drive chains 199 and 200.

While the above description of the present machine is chiefly with reference to a three-tunnel machine it will be clear that the features may be readily embodied in a machine utilizing but a single tunnel. In such event there will be utilized a "single width" feed hopper, a single set of fruit moving rollers and guides, and a narrower abrading chamber containing but a single set of abrading channel rollers and abrading channel feed screw. A simplified drive may be provided for such a single tunnel machine, one motor driving the abrading channel feed screw and abrading rollers forming one side of an abrading channel, and a separate second motor driving the abrading rollers forming an opposite side of an abrading channel. Various numbers of tunnels may be used either singly or in combination along the lines of the above described three tunnel machine.

It will be seen that the present invention provides a new and improved machine for removing the outer coverings and the contained oils and waxes from citrus fruits such as oranges, grapefruit, lemons, et cetera. Fruit feeds from an inlet hopper in uniform rate onto the fruit moving screws and oppositely disposed guide channels. An agitator positioned at the bottom of a hopper provides a gentle disturbing or agitating effect which effectively minimizes jamming of fruit in the hopper, even in those instances where fruit enters the hopper at a rate faster than the abrading or grating rollers can treat it. The fruit travels along the fruit moving rollers in substantially continuously flowing line up a gentle slope and into the abrading chamber. The fruit moving rollers rotate upwardly and away from each other in such manner as to prevent squeezing or jamming of fruit downwardly between the fruit feeding rollers. Oranges do not pile up on top of each other in movement along the fruit moving rollers but instead the fruit passes in single file and a fruit is automatically placed in the grater or abrading chamber 13 only when there is room for it; that is, as fruit moves out the discharge end of the abrading chamber corresponding fruit moves in at the entrance end of the chamber. In the event of some unforeseen sudden stoppage in abrading or grating operations the fruit rolls over and over without abrasion or damage until such time as the defect is remedied and then fruit again commences to automatically move into the abrading chamber.

The abrading chamber feed screws move fruit along the abrading rollers in continuously flowing rows and provides an additional axis of rotation for the fruit put in spinning motion by rotation of the abrading rollers. Reversely or oppositely wound abrading strips on the abrading rollers effect further changes in the spinning axes of the fruit. The violence of the spinning and bouncing of fruit due to the changing directions cause the fruit to strike the abrasive spaces hard enough to flatten out any bumps or depressions in the contour of the fruit so that the abrasive surface reaches every part of the surface of even the most distored fruits; lemons and limes with their long diameters are uniformly grated or abraded in the present machines. The abrading or grating rollers do not injure the fruit but leave them in prime condition to enter the juicing process machinery.

Water sprays directed downwardly against the abrading rollers wash grated-off particles from the rollers downwardly to and along the bottom of the abrading chamber into a collecting trough; the resulting slurry may be pumped or sucked from the collecting trough.

Changes in the sizes of the various pulleys may be made to adjust the rotational speeds of the abrading rollers in accordance with any seasonal changes in characteristics of the fruit and also to vary the rate of feed which sets the abrading or grating time. Changes in the abrading time may also be made by varying the output speeds from the speed reducer and utilizing different drive sprockets. No sizing mechanisms or devices are necessary with the present abrading or grating machine. The machine is adapted to efficiently and effectively treat various sizes of fruit; in extreme cases the spaced positions of the abrading rollers may be suitably adjusted.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A machine of the class described comprising the combination of means forming a passageway for constraining fruit to substantially linear relationship including horizontally elongated spaced walls, at least one of said walls being transversely downwardly inclined, for directing fruit toward a converging lower portion thereof and also including a generally horizontal substantially smooth fruit-supporting roller extending below said converging portions having a low generally spirally arranged rib projecting from the periphery thereof for supporting thereon and moving therealong toward a discharge end a portion of a substantially continuous and single row of fruit, generally horizontally disposed elongated abrasively coated fruit abrading rollers arranged in a substantially enclosed unobstructed passageway substantially axially aligned with and in direct communication with said first named passageway for containing and restraining to linear relationship another portion of said row of fruit and for freely receiving fruit from said first passageway, and a generally horizontal substantially smooth supporting roller having a low generally spirally arranged rib projecting from the periphery thereof disposed in the lower portion of said second mentioned passageway and extending lengthwise of and intermediate certain of said abrading rollers for supporting and advancing the portion of the fruit row in said second mentioned passageway and cooperating with the abrading rollers to toss the fruit about during movement along the second mentioned passageway so as to abrade it upon contact with the abrading rollers, whereby fruit in said first passageway presses forwardly against fruit in said second mentioned passageway and fruit in said second mentioned passageway tends to hold back fruit in said first passageway until discharge of fruit from an outlet end of said second mentioned passageway.

2. A machine as claimed in claim 1, in which said ribs of the supporting rollers have generally rounded exposed surfaces.

3. A machine as claimed in claim 1, in which said supporting roller of the second passageway has a diameter less than that of certain of the abrading rollers.

4. A machine as claimed in claim 1, in which said supporting roller of the first passageway has its discharge end slightly higher than its opposite end.

5. A machine as claimed in claim 1, in which a hopper is provided adjacent an inlet end of said first passageway, and agitating means is located adjacent a lower part of said hopper for enhancing movement of fruit from the hopper into said first passageway.

6. A machine as claimed in claim 5, in which said agitating means comprises a movable member, and means is operatively connected and rotatable with the supporting roller of said first passageway for intermittently moving said member.

CHARLES E. FRASER.

REFERENCES CITED

The following references are of record in the file of this patent:

UNITED STATES PATENTS

| Number | Name | Date |
|---|---|---|
| 153,956 | Hicklin | Aug. 11, 1874 |
| 611,968 | Kempster | Oct. 4, 1898 |
| 1,186,317 | Hood | June 6, 1916 |
| 1,190,554 | Kelly | July 11, 1916 |
| 1,705,230 | Binns | Mar. 12, 1929 |
| 1,767,775 | Slick, Jr. | June 24, 1930 |
| 1,883,078 | Stretch | Oct. 18, 1932 |
| 1,928,339 | Mulvany | Sept. 26, 1933 |
| 1,995,693 | Urschel | Mar. 26, 1935 |
| 2,134,608 | Hawkins | Oct. 25, 1938 |
| 2,146,267 | Perez | Feb. 7, 1939 |
| 2,208,787 | Brown | July 23, 1940 |
| 2,249,787 | Savage | July 22, 1941 |
| 2,338,136 | Shaw et al. | Jan. 4, 1944 |
| 2,367,757 | Cutler | Jan. 23, 1945 |
| 2,438,239 | Toulmin, Jr. | Mar. 23, 1948 |
| 2,454,015 | Sheppard | Nov. 16, 1948 |
| 2,477,006 | Pierson | July 26, 1949 |

FOREIGN PATENTS

| Number | Country | Date |
|---|---|---|
| 118,279 | Australia | Mar. 14, 1944 |